(12) United States Patent
Olberg et al.

(10) Patent No.: US 11,517,866 B2
(45) Date of Patent: Dec. 6, 2022

(54) EXTRUDING NOZZLE, SYSTEM, AND METHOD THEREFOR

(71) Applicant: The Boeing Company, Chicago, IL (US)

(72) Inventors: Jeffrey H. Olberg, Federal Way, WA (US); Stephen L. Metschan, Black Diamond, WA (US); Richard V. Phillips, Enumclaw, WA (US); Daniel J. Perron, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 17/191,952

(22) Filed: Mar. 4, 2021

(65) Prior Publication Data

US 2021/0187462 A1 Jun. 24, 2021

Related U.S. Application Data

(62) Division of application No. 16/156,122, filed on Oct. 10, 2018, now Pat. No. 10,987,645.

(51) Int. Cl.
*B01J 2/20* (2006.01)
(52) U.S. Cl.
CPC ..................... *B01J 2/20* (2013.01)

(58) Field of Classification Search
CPC ..... B29C 48/87; B29C 48/872; B29C 48/873; B01J 2/20
See application file for complete search history.

(56) References Cited

U.S. PATENT DOCUMENTS

| 3,385,917 | A | 5/1968 | Berukink et al. |
|---|---|---|---|
| 7,294,299 | B2 | 11/2007 | Yamanaka et al. |
| 2003/0161909 | A1 | 8/2003 | Corry et al. |
| 2005/0140044 | A1 | 6/2005 | Jackson et al. |
| 2007/0172533 | A1 | 7/2007 | Pinchot |
| 2019/0224900 | A1 | 7/2019 | Stapleton |

OTHER PUBLICATIONS

Bonnot; "Our Custom Made Extruders Offer the Ability to Process Multiple Kinds of Materials in Varying Quantities and Volume in a Number of Different Ways" 2018, http://www.thebonnotco.com/extruders/.

*Primary Examiner* — Timothy Kennedy
(74) *Attorney, Agent, or Firm* — Perman & Green, LLP

(57) ABSTRACT

A method for pelletizing an extruded material with an extruding nozzle includes inserting the extruded material into the extruding nozzle so that the extruded material flows through at least one material-flow channel, extending through a radiator of the extruding nozzle. Heat is transferred between the extruded material, flowing through the at least one material-flow channel, and the radiator. At least a portion of the radiator is located within a housing of the extruding nozzle.

20 Claims, 11 Drawing Sheets

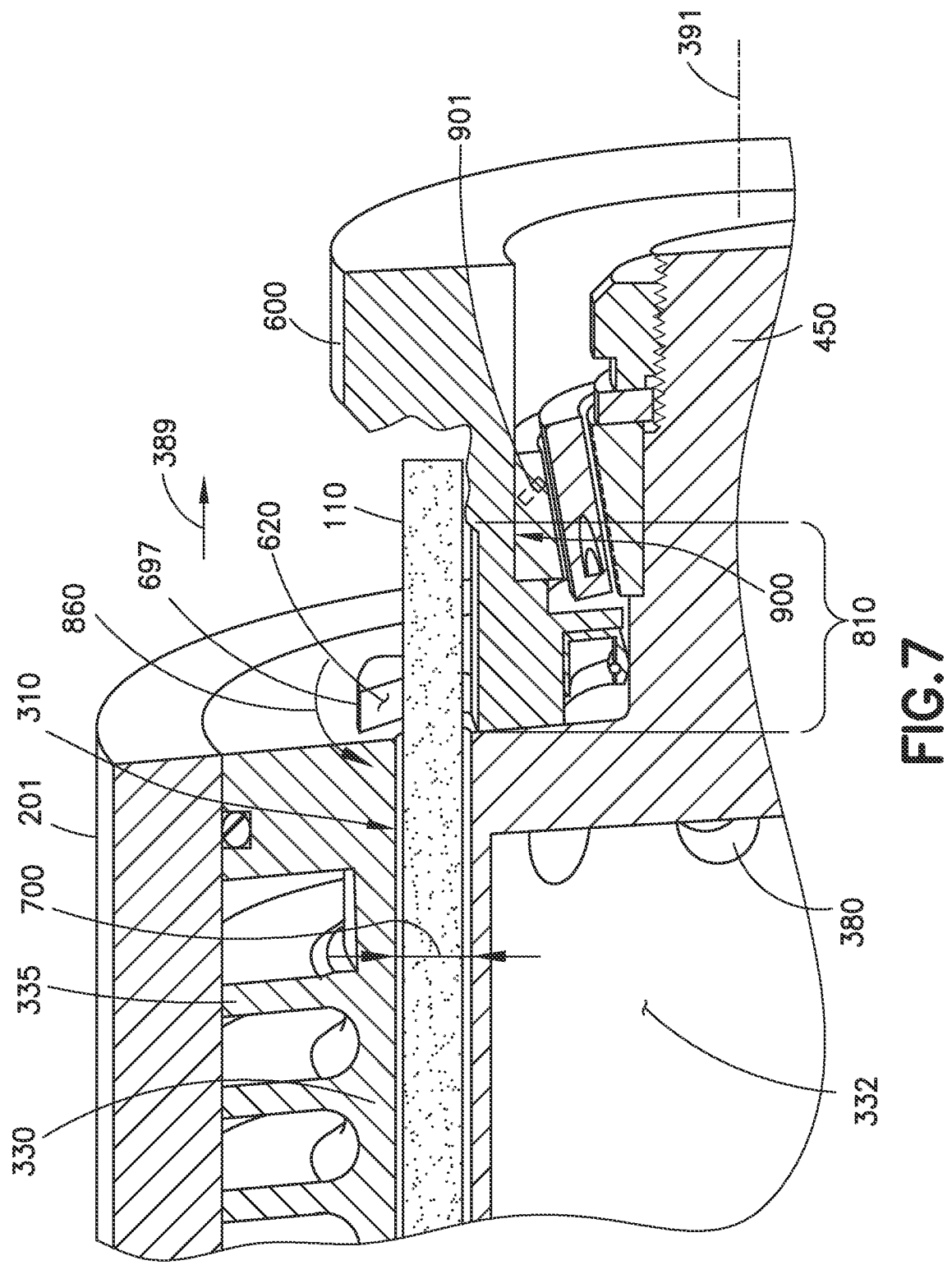

__US 11,517,866 B2__

EXTRUDING NOZZLE, SYSTEM, AND METHOD THEREFOR

CROSS REFERENCE TO RELATED APPLICATION

This application is a divisional of and claims the benefit of U.S. patent application Ser. No. 16/156,122 filed on Oct. 10, 2018 (Now U.S. Pat. No. 10,987,645 issued on Apr. 27, 2021), the disclosure of which is incorporated herein by reference in its entirety.

BACKGROUND

1. Field

The exemplary embodiments generally relate to extrusion of materials and more particularly to the pelletization of the extruded materials.

2. Brief Description of Related Developments

Generally, to pelletize a material the material is fed through an extruder to form the material into an elongated shape. A cutter then cuts the material into segments (e.g., pellets) upon exit from the extruder. Materials that are pelletized are generally those that are easily cut; however, extruded materials that are not completely solidified when pelletizing is attempted are smeared by the cutter rather than cut. The smearing of the extruded material generates inconsistently sized pellets and clogs the pelletizing machine.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an extruding nozzle comprising: a housing; a radiator at least partially disposed within the housing; and at least one material-flow channel at least partially disposed within the housing and extending through the radiator.

Another example of the subject matter according to the present disclosure relates to an extruding nozzle system comprising: an extruding nozzle including a housing, a radiator at least partially disposed within the housing, at least one material-flow channel at least partially disposed within the housing and extending through the radiator, and a breaker head rotatably coupled to one or more of the housing and the radiator, the breaker head being configured to break extruded material exiting the at least one material-flow channel into pellets; and a drive coupled to the breaker head so as to rotate the breaker head in a predetermined rotational movement.

Still another example of the subject matter according to the present disclosure relates to a method for pelletizing an extruded material with an extruding nozzle, the method comprising: inserting the extruded material into the extruding nozzle so that the extruded material flows through at least one material-flow channel extending through a radiator of the extruding nozzle; and transferring heat between the extruded material flowing through the at least one material-flow channel and the radiator, where the radiator is at least partially disposed within a housing of the extruding nozzle.

BRIEF DESCRIPTION OF THE DRAWINGS

Figure 1:
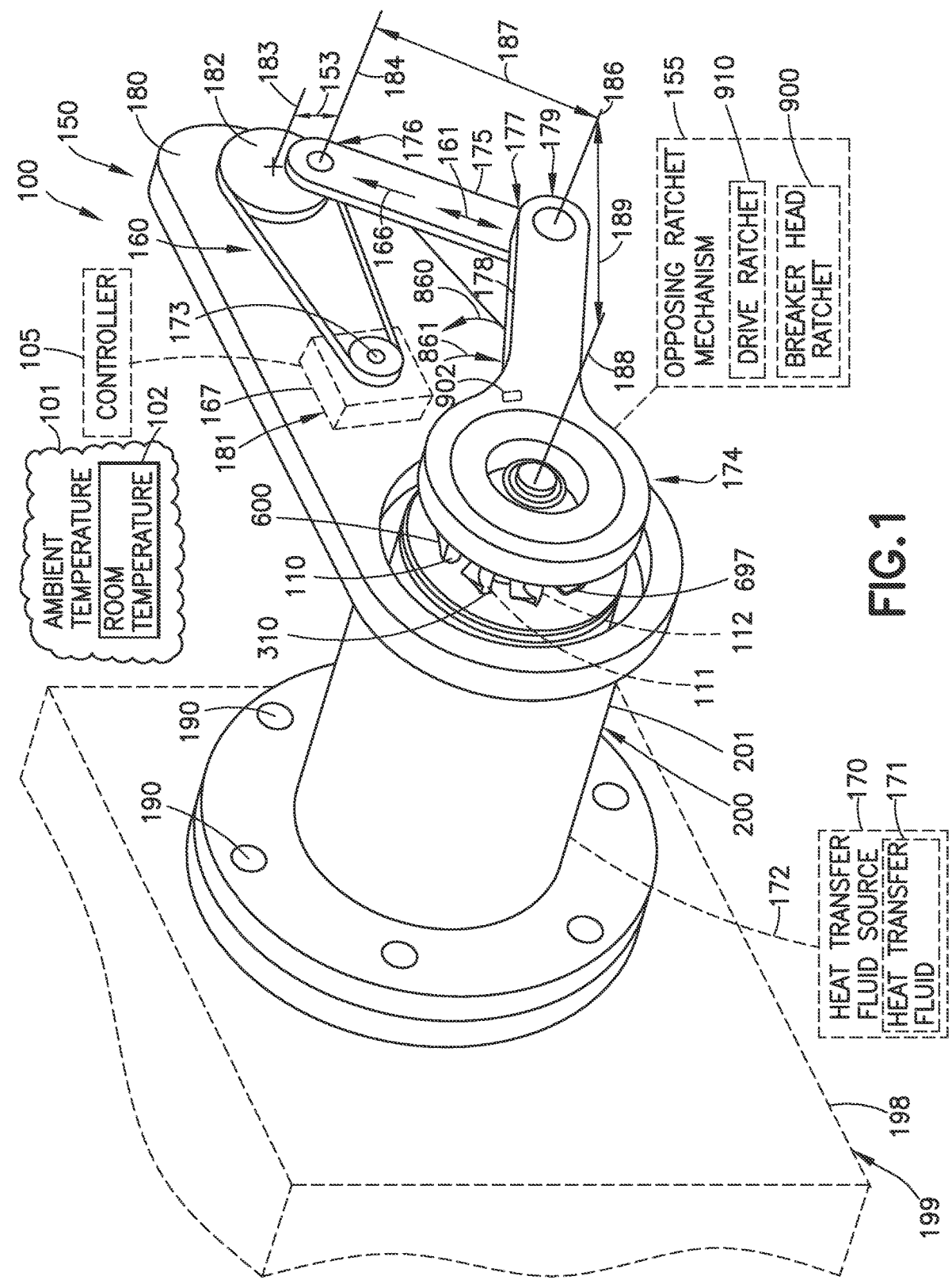
Figure 2B:
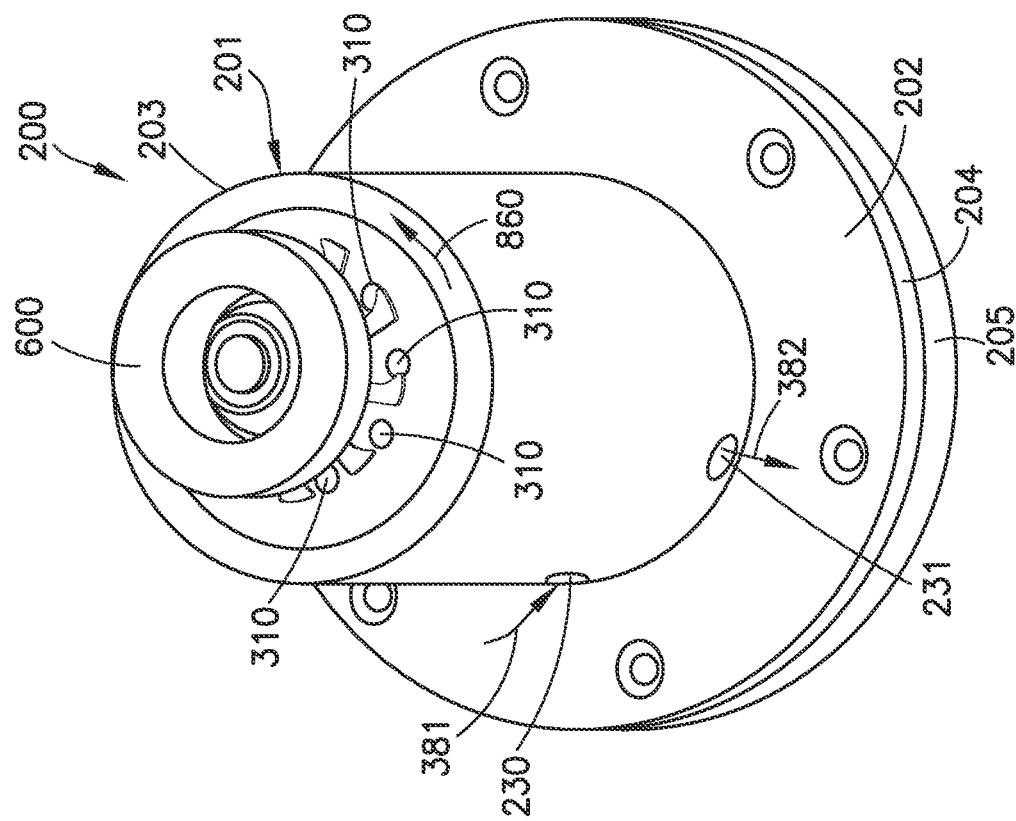
Figure 2A:
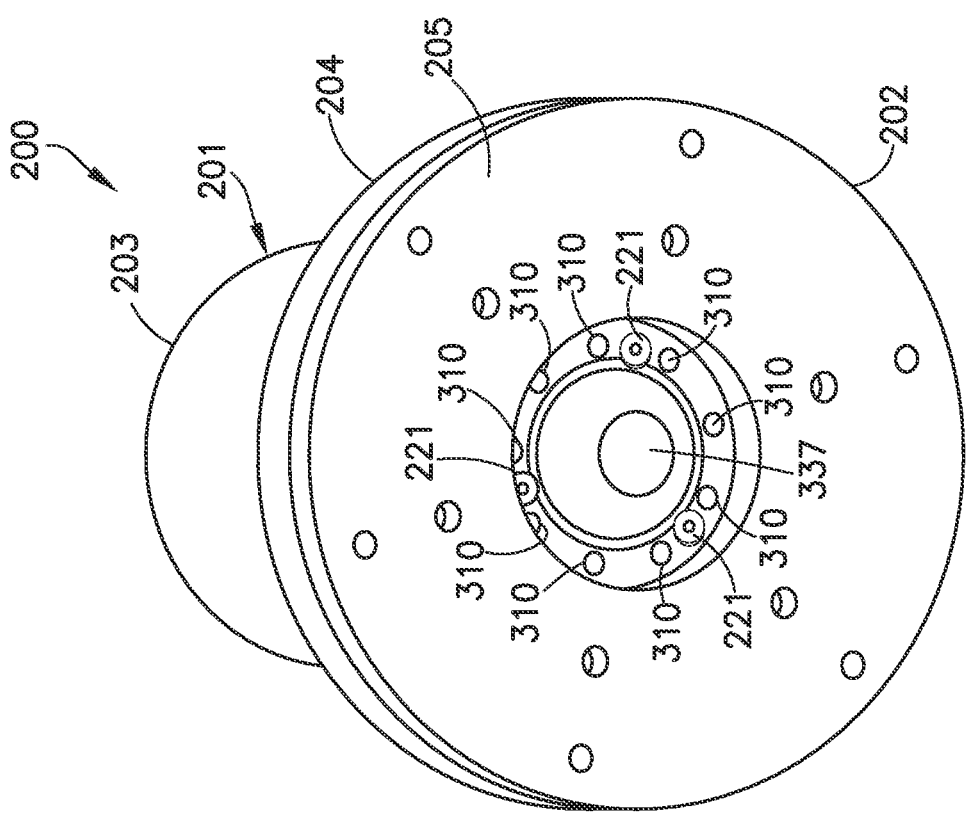
Figure 3A:
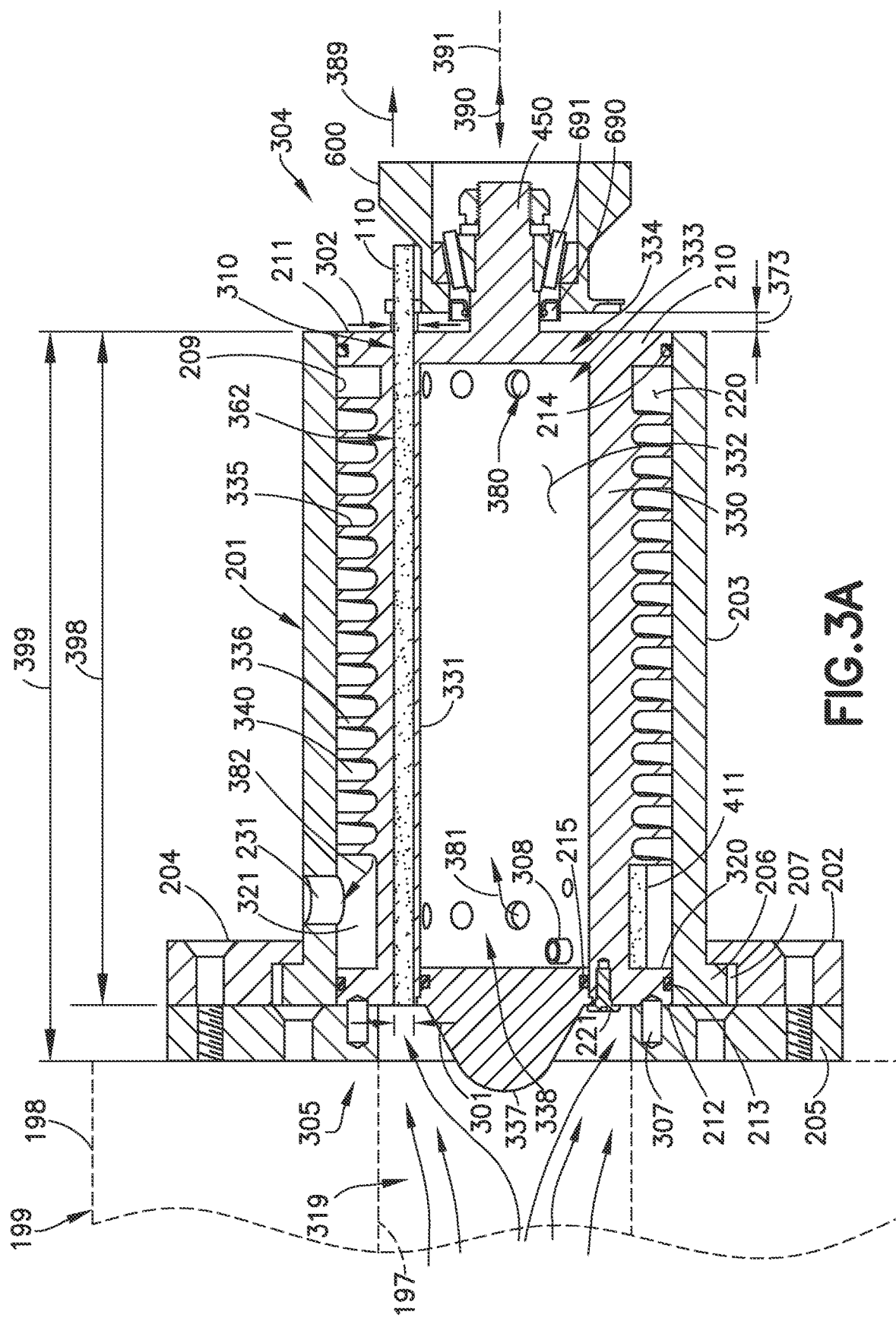
Figure 3B:
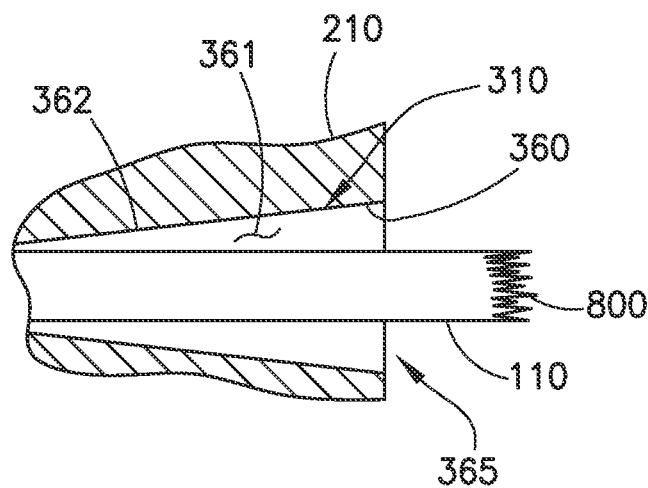
Figure 5:
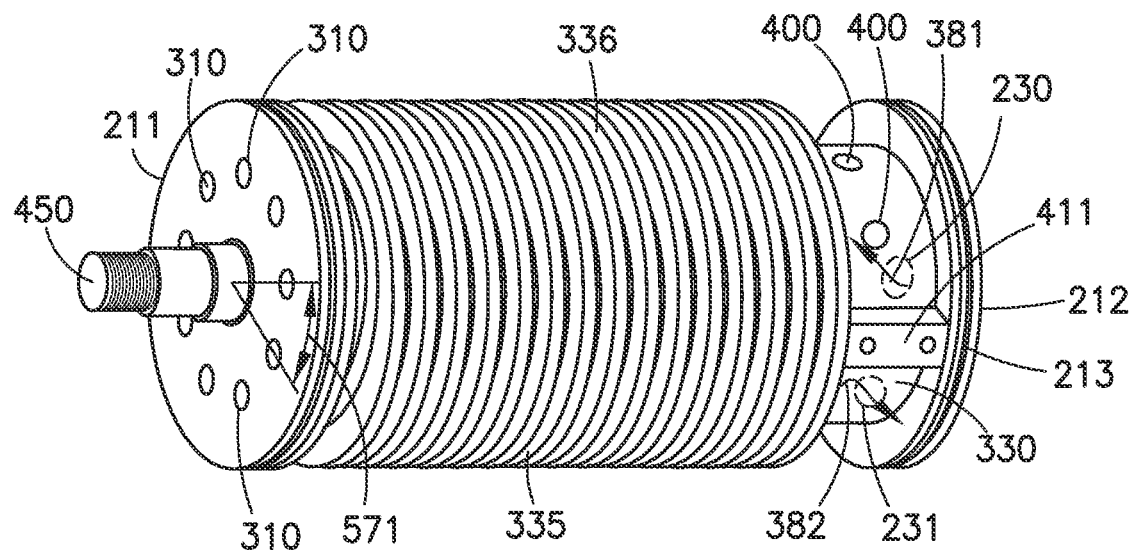
Figure 4A:
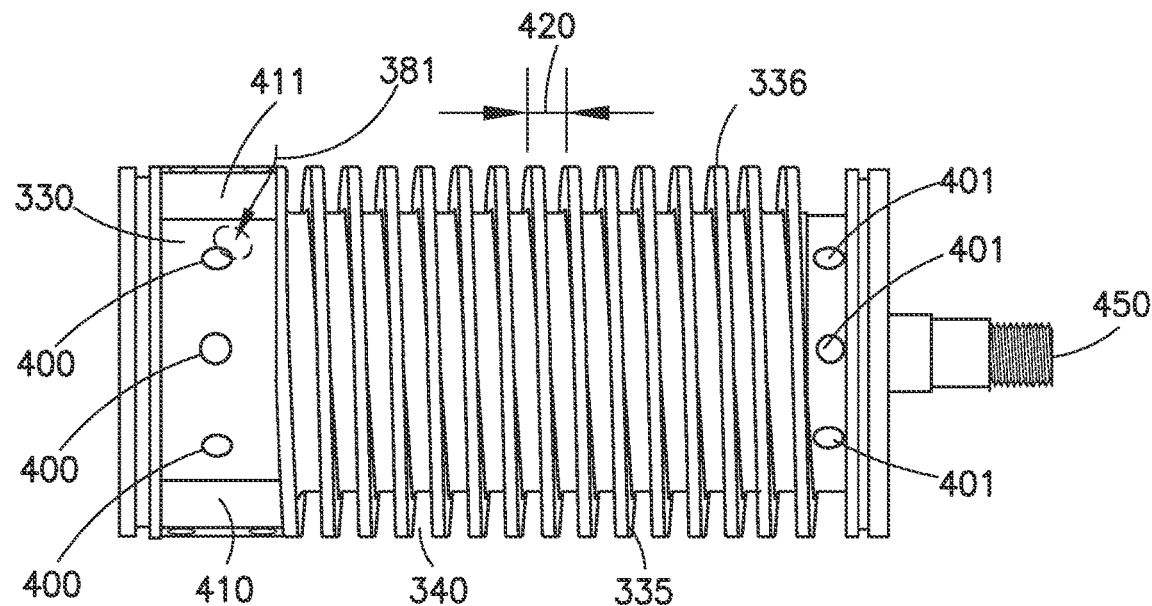
Figure 4B:
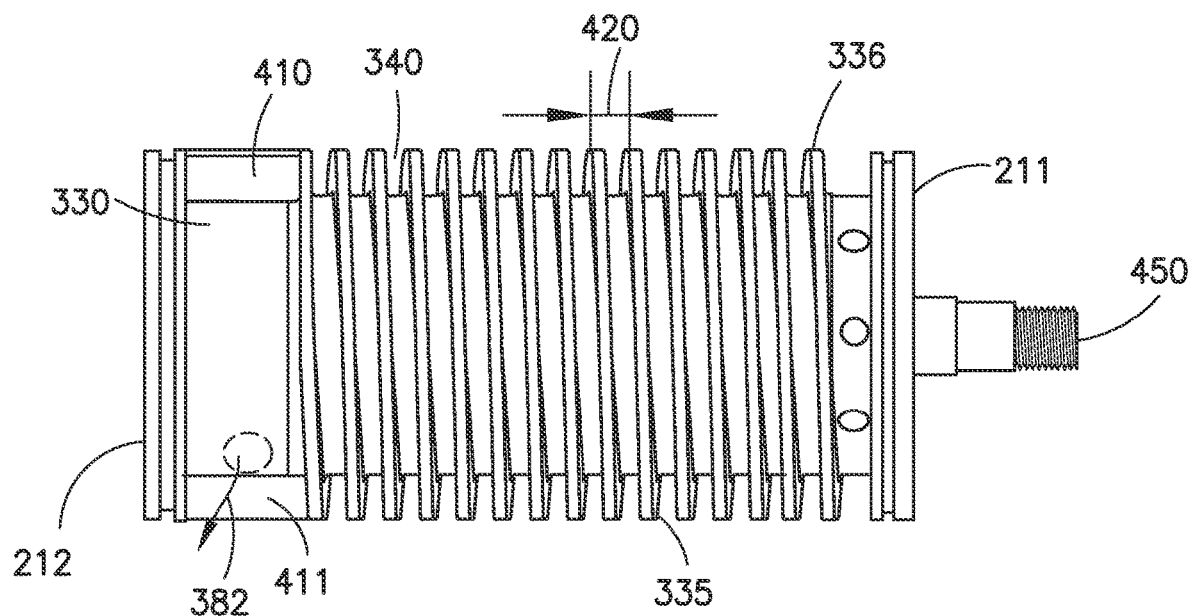
Figure 6B:
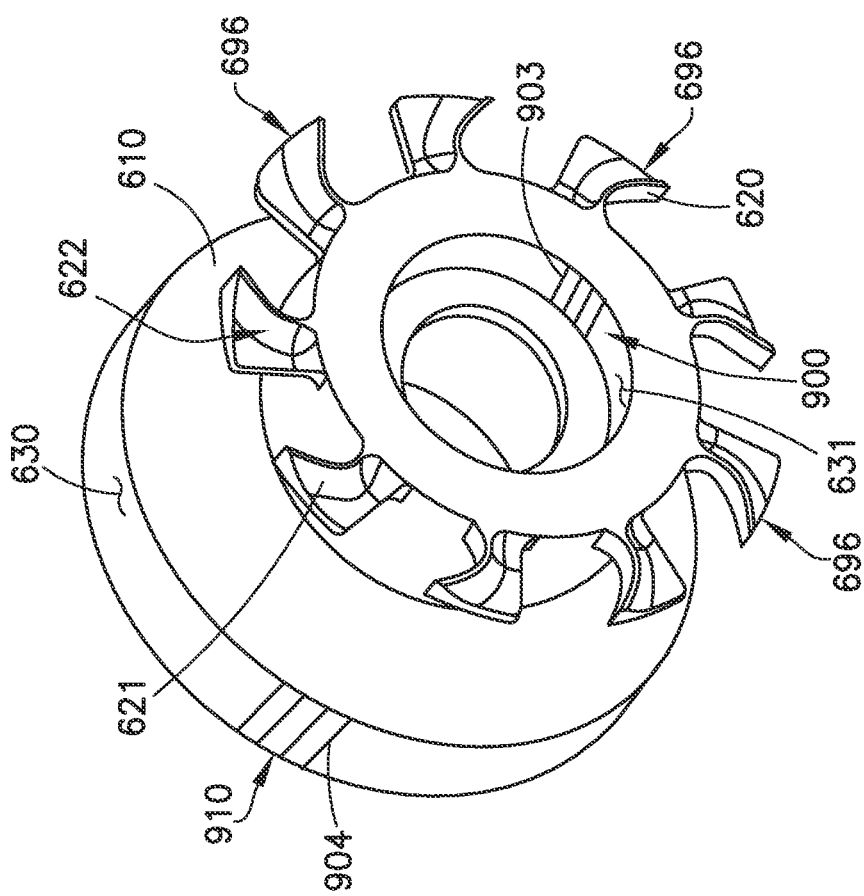
Figure 6A:
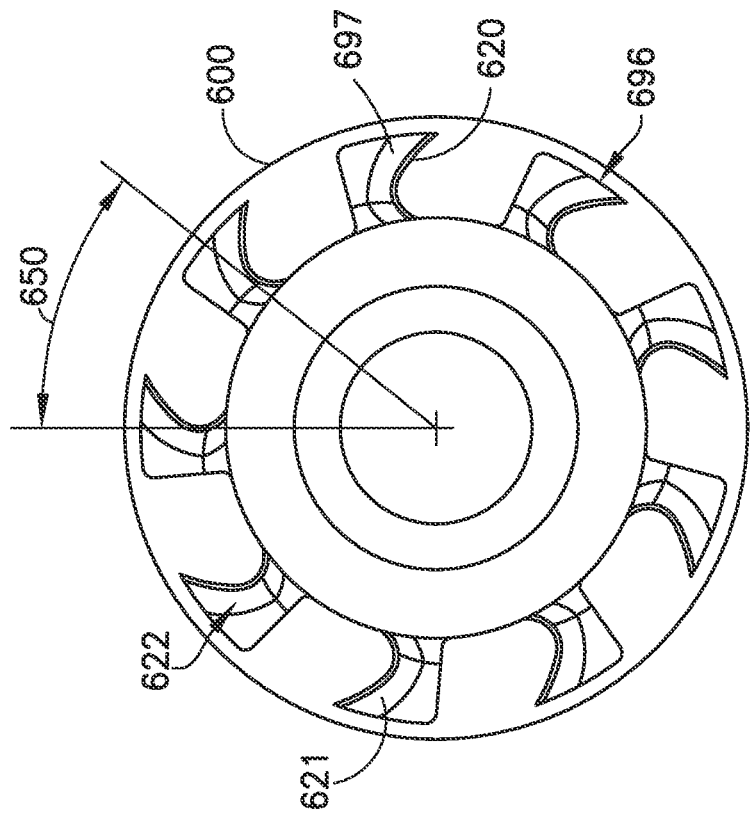
Figure 6C:
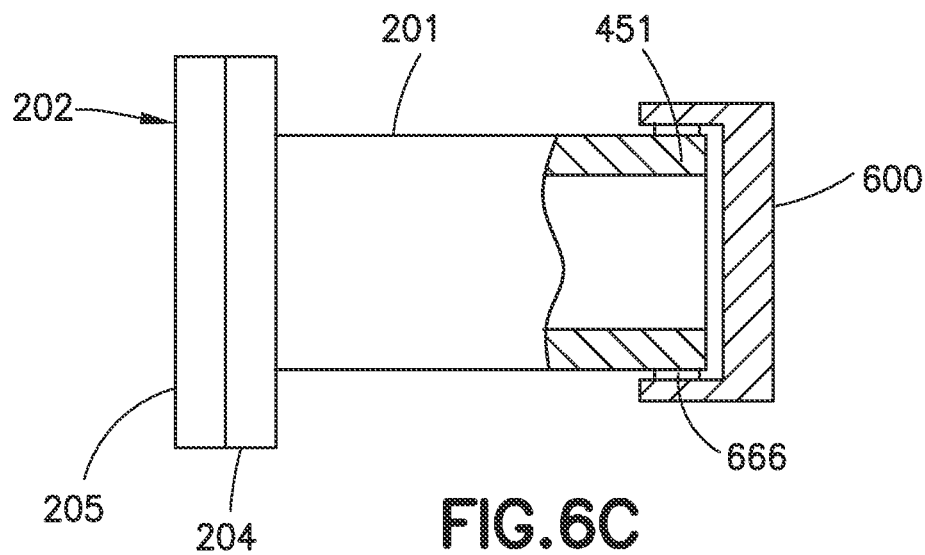
Figure 6D:
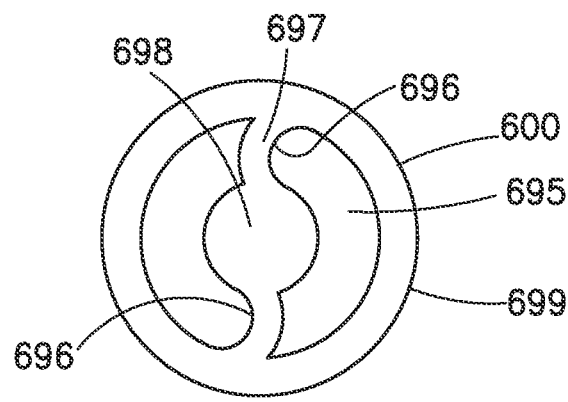
Figure 6E:
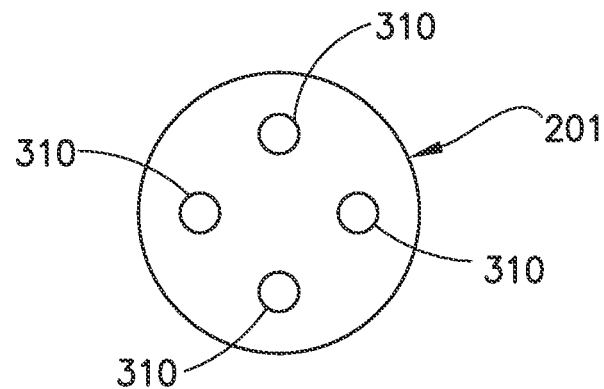
Figure 8A:
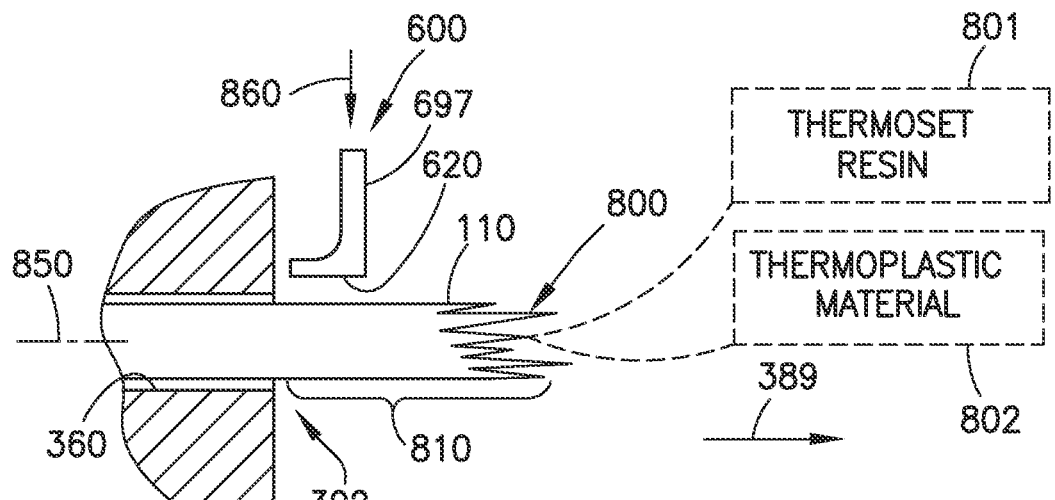
Figure 8B:
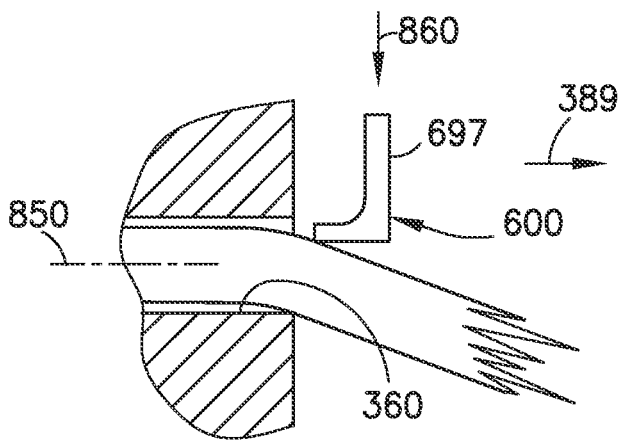
Figure 8C:
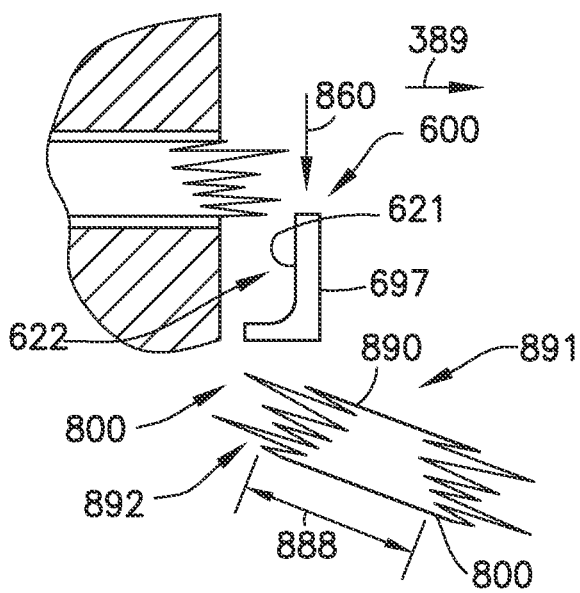
Figure 9:
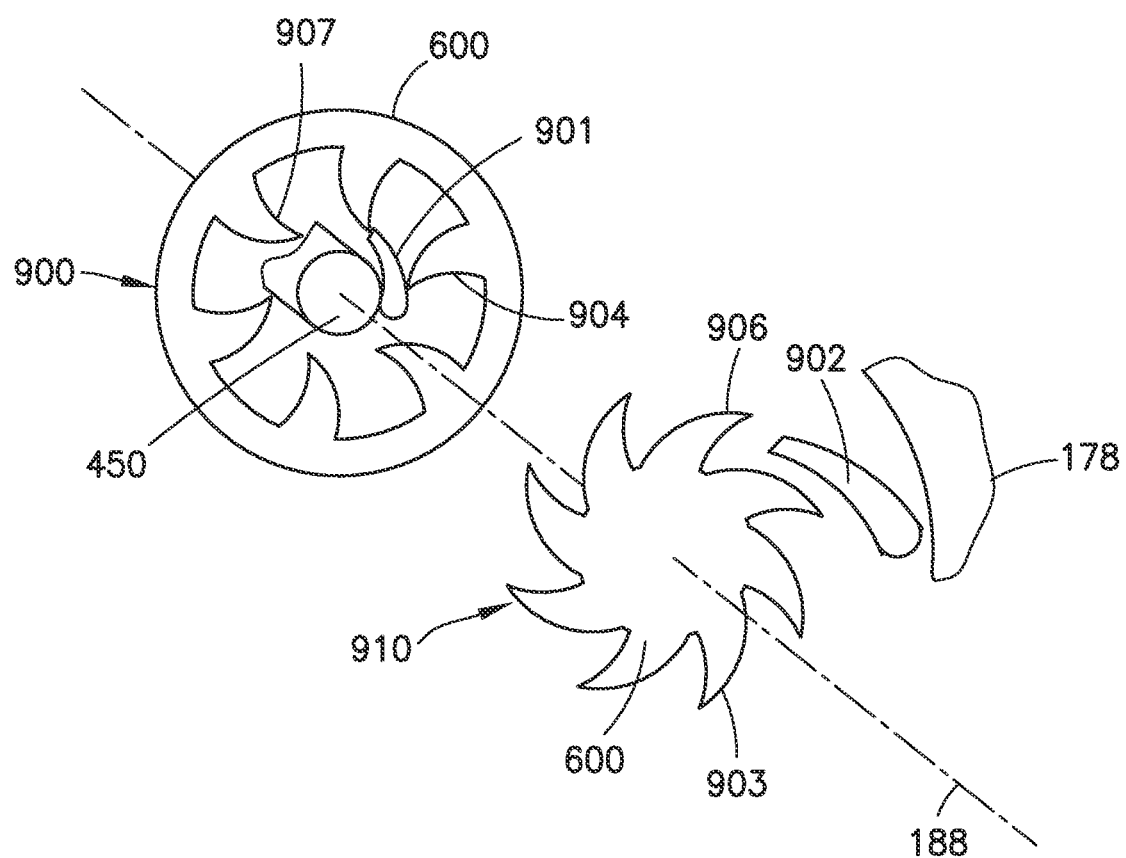
Figure 10:
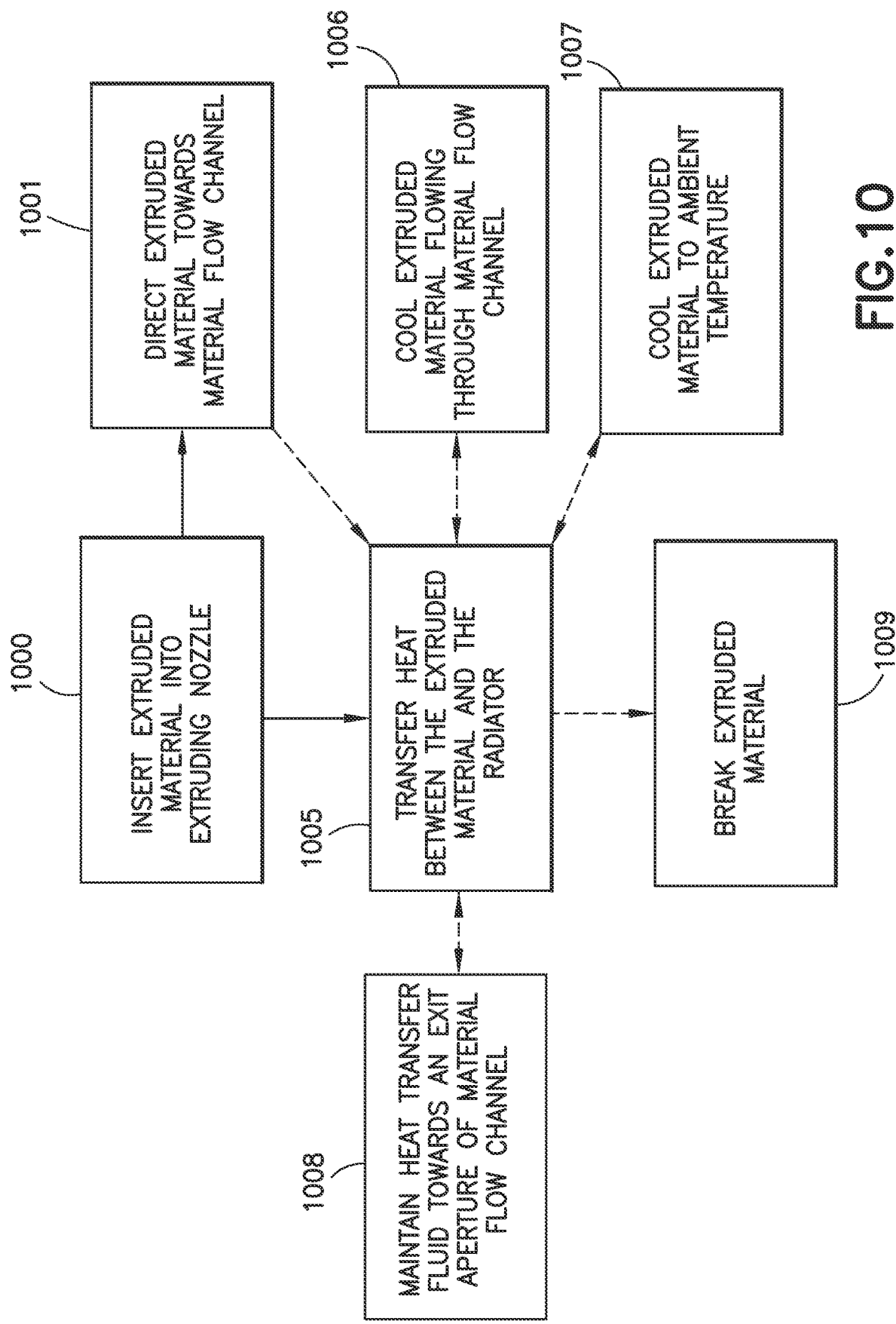

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic perspective illustration of an extruding nozzle system in accordance with aspects of the present disclosure;

FIG. 2A is a rear perspective illustration of an extruding nozzle of the extruding nozzle system of FIG. 1 in accordance with aspects of the present disclosure;

FIG. 2B is a front perspective illustration of the extruding nozzle of FIG. 2A in accordance with aspects of the present disclosure;

FIG. 3A is a side cross-sectional illustration of the extruding nozzle of FIG. 2A in accordance with aspects of the present disclosure;

FIG. 3B is a portion of the side cross-sectional illustration of the extruding nozzle of FIG. 3A in accordance with aspects of the present disclosure;

FIG. 4A is a side view of a portion of the extruding nozzle of FIG. 2A in accordance with aspects of the present disclosure;

FIG. 4B is another side view of the portion of extruding nozzle system of FIG. 4A in accordance with aspects of the present disclosure;

FIG. 5 is a perspective view of the portion of extruding nozzle system of FIG. 4A in accordance with aspects of the present disclosure;

FIG. 6A is a front plan illustration of a breaker head of the extruding nozzle of FIG. 2A in accordance with aspects of the present disclosure;

FIG. 6B is a front perspective illustration of the breaker head FIG. 6A in accordance with aspects of the present disclosure;

FIG. 6C is a side view illustration of the extruding nozzle of FIG. 2A in accordance with aspects of the present disclosure;

FIG. 6D is a front view illustration of a breaker head of FIG. 6C in accordance with aspects of the present disclosure;

FIG. 6E is a front perspective illustration of a portion of the extruding nozzle of FIG. 6A in accordance with aspects of the present disclosure;

FIG. 7 is a perspective partial cross-sectional illustration of a portion of the extruding nozzle of FIG. 2A in accordance with aspects of the present disclosure;

FIGS. 8A, 8B, and 8C are cross-sectional illustrations of a portion of the extruding nozzle of FIG. 2A showing a sequence of extruded material breakage/fracture in accordance with aspects of the present disclosure;

FIG. 9 is a perspective illustration of a portion of the extruding nozzle of FIG. 2A in accordance with aspects of the present disclosure; and FIG. 10 is a flow diagram of an exemplary method in accordance with aspects of the present disclosure.

DETAILED DESCRIPTION

Referring to FIGS. 1 and 2A, the aspects of the present disclosure provide for an extruding nozzle system 100 and extruding nozzle 200 for pelletizing extruded material 110 that would otherwise not be completely solidified (e.g., have a sticky or semi-solid consistency) during an extrusion process. Such materials include, but are not limited to, thermoset resin materials 111 and thermoplastic materials 112. The extruded material 110, is a "highly-filled material" which is a material that has a saturation of reinforcing fibers 800 (see FIGS. 8A-8C) of at least about 40% fiber to about 60% fiber. In other aspects, the extruded material 110 may have a saturation of reinforcing fibers 800 of less than about 40% or more than about 60%. The reinforcing fibers 800 (see FIGS. 8A-8C) may be any suitable reinforcing fiber including, but not limited to, glass fiber and carbon fiber.

The aspects of the present disclosure may provide for consistently sized pellets 890 (FIGS. 8A-8C) of any suitable length 888 (FIGS. 8A-8C) through a rapid cooling of the extruded material 110 before being broken or snapped by breaker head 600 of the extruding nozzle 200. For example, the extruding nozzle system 100 and/or extruding nozzle 200 may be coupled to any suitable extruding machine 199, so as to form an extruding nozzle of the extruding machine 199. The extruding nozzle 200 receives the extruded material 110 from a heated barrel of 198 the extruding machine 199. The extruded material 110 passes from the heated barrel 198 to the extruding nozzle 200 where it is cooled from an extrusion temperature of the heated barrel 198 to about room temperature 102 (e.g., an ambient temperature 101 external to the extruding nozzle 200) over at least a portion of a length 399 of the extruding nozzle 200 (e.g., the extruded material is "rapidly cooled"). In one aspect, room temperature 102 is about 70° F. (about 21° C.), while in other aspects room temperature 102 may be any suitable temperature greater or less than about 70° F. (about 21° C.) of a room in which pelletizing of the extruded material 110 occurs. Cooling the extruded material 110 with the extruding nozzle 200 may provide for the breaking or fracturing of the extruded material 110 into pellets 890 (FIG. 8) substantially directly upon exiting the extruding machine 199. The extruding nozzle 200 may be constructed of any suitable material having a high thermal transfer rate including but not limited to aluminum, copper, silver, aluminum alloys, copper alloys, silver alloys, metal matrix composites aluminum, metal matrix composites copper, and/or metal matrix composites silver.

The aspects of the present disclosure may provide for an in-line palletization process for (e.g., in-line with the extrusion of) the extruded material 110 as the extruded material 110 exits the extruding machine 199. The aspects of the present disclosure may also provide for consistent pellet lengths (e.g., from pellet to pellet) while reducing dust/fine particles of the extruded material 110 that may be generated by the pelletization process.

Still referring to FIG. 1, the extruding nozzle system 100 includes the extruding nozzle 200 and a drive 150 coupled to at least the extruding nozzle 200. Referring also to FIGS. 2A, 2B, and 3A the extruding nozzle 200 includes a housing 201, a radiator 210, and at least one (or more than one) material-flow channel 310. The housing 201 may have any suitable shape and is illustrated as being cylindrical for exemplary purposes only. The housing 201 includes an elongated portion 203.

An extruder flange 202 of the extruding nozzle 200 is coupled to one or more of the housing 201 and radiator 210. The extruder flange 202 is configured to couple the extruding nozzle 200 to the extruding machine 199. For example, and any suitable extruder flange 202 that is configured to couple with the heated barrel 198 of the extruding machine 199 so that the extruding nozzle 200 is in fluid communication with a material passage 197 (FIG. 3A) of the heated barrel 198. The extruder flange 202 may be coupled to the heated barrel 198 in any suitable manner such as with mechanical fasteners 190. The extruder flange 202 and elongated portion 203 may be integrally formed as a single one piece member; while in other aspects, the extruder flange 202 may be a multiple piece member that is coupled to the elongated portion 203 in any suitable manner. For example, where the extruder flange 202 is a multiple piece member, the extruder flange 202 includes a retaining portion 204 and a cap portion 205. The elongated portion 203 includes a flange 206 that is disposed within a recess 207 of the retaining portion 204. The cap portion 205 is coupled to the retaining portion 204 so that the flange 206 of the elongated portion 203 is held captive between the retaining portion 204 and the cap portion 205.

Referring to FIG. 3A, the radiator 210 is at least partially disposed within the housing 201. For example, the housing includes an inner surface 209 that forms an interior 220 of the housing 201. The radiator 210 is disposed within the interior 220 and includes an inlet end cap 212 and an outlet end cap 211 that close the inlet end 305 and outlet end 304 of the housing 201 so as to seal (e.g., make fluid tight) the interior 220. The inlet end cap 212 and the outlet end cap 211 include any suitable seals 213, 214 that couple with both the inner surface 209 and a respective one of the inlet end cap 212 and the outlet end cap 211 to seal the interior of the housing 201. For example, at least one (or more than one) seal 213 is disposed between the extruder flange 202 and one or more of the housing 201 and the radiator 210 so as to seal heat-transfer fluid 171 (FIG. 1) flow through the extruding nozzle 200. At least one (or more than one) seal 214 is disposed between the housing 201 and the radiator 210 so as to seal heat-transfer fluid 171 (FIG. 1) flow through the extruding nozzle 200.

The inlet end cap 212 is disposed within a recess 320 of the elongated portion 203 so as to be held captive (e.g., so that the radiator 210 is fixed and does not move relative to the elongated portion 203 in the longitudinal direction 390) between the elongated portion 203 and the cap portion 205 of the flange 206. The radiator 210 is also rotationally fixed to the housing 201 so that the radiator does not rotate about the longitudinal axis 391. For example, any suitable pins 307 or other suitable anti-rotation members are coupled to both the cap portion 205 of the flange 206 and the inlet end cap 212 of the radiator 210 to rotationally fix the radiator 210 relative to the housing 201. In other aspects, the complementing geometries of the inner surface 209 and the radiator 210 (e.g., such as a square, triangular, hexagonal, octagonal, etc. shape) may rotationally fix the radiator 210 relative to the housing 201. In still other aspects, any suitable mechanical fasteners 308 may rotationally and/or longitudinally fix and/or couple the radiator 210 to the housing 201.

The radiator 210 includes a core member 330 having at least one (or more than one) peripheral wall 331. A heat-transfer-fluid passage 332 is formed by the at least one peripheral wall 331 within an interior 333 of the core member 330. The outlet end cap 211 may form a portion of the at least one peripheral wall 331 so as to close an outlet end of the heat-transfer-fluid passage 332. The radiator 210 includes a diverter member 337 (see also FIG. 2A) coupled to the radiator 210. In one aspect, the diverter member 337 may be integral to the inlet end cap 212; while in other aspects the diverter member 337 may be coupled to the inlet end cap 212 in any suitable manner, such as with mechanical fasteners 221 (see also FIG. 2A). The diverter member 337 closes an inlet end 338 of the heat-transfer-fluid passage 332 of the core member 330. Any suitable seal 215 may be coupled to both, and disposed between, the diverter member 337 and the at least one peripheral wall 331 so as to seal the heat-transfer-fluid passage 332. The diverter member 337 is configured in any suitable manner to divert extruded material 110 (such as extruded material flow 319) from the extruding machine 199 (such as from the material passage 197 of the heated barrel 198) to the at least one material-flow channel 310. For example, the diverter member 337 is contoured to fill any voids between the material passage 197 and the core member 330 to direct the extruded material 110 from the material passage 197 to the at least one material-flow channel 310 substantially without stagnation of the extruded material 110.

The core member 330 also includes heat-transfer fins 335 that extend radially outward (relative to the longitudinal axis 391) from the at least one peripheral wall 331. The heat-transfer fins 335 comprise a helical fin 336 extending at least partially along a length 398 of the core member 330 (which length 398 may be greater than, less than, or substantially equal to the length 399 of the extruding nozzle 200) so as to form a helical heat-transfer-fluid passage 340 between the core member 330 and the housing 201. As an example, the length 398 may be about 9 inches (about 23 cm) while in other aspects the length 398 maybe more or less than about 9 inches (about 23 cm). In one aspect, the extruded material 110 is cooled from the extrusion temperature of the heated barrel 198 to about room temperature 102 (FIG. 1) over at least a portion of the length 398 of the core member 330. The heat-transfer fins 335 are configured (e.g., through one or more of the pitch and location along the longitudinal axis 391) so as to increase heat transfer rate between the extruded material 110 and the heat-transfer fluid 171 (see FIG. 1) at the outlet end 304 of the housing 201 when compared to heat transfer at the inlet end 305 of the housing.

Referring to FIGS. 2B, 3A, 4A-4B, and 5, to facilitate heat-transfer fluid 171 flow through the extruding nozzle 200, at least one (or more than one) first heat-transfer-fluid aperture 400 extends through the at least one peripheral wall 331. At least one (or more than one) second heat-transfer-fluid aperture 401 extends through the at least one peripheral wall 331 communicably coupling heat-transfer-fluid flow 380, 381, 382 between the heat-transfer-fluid passage 332 and the heat-transfer fins 335. The housing 201 (such as the elongated portion 203 of the housing 201) includes at least one (or more than one) third heat-transfer-fluid aperture 230 and at least one fourth heat-transfer-fluid aperture 231. The at least one third heat-transfer-fluid aperture 230 is communicably coupled with the at least one first heat-transfer-fluid aperture 400 of the radiator 210. The at least one (or more than one) fourth heat-transfer-fluid aperture 231 is communicably coupled with the at least one second heat-transfer-fluid aperture 401 of the radiator 210.

At least one (or more than one) baffle 410, 411 is disposed between the at least one third heat-transfer-fluid aperture 230 and the at least one fourth heat-transfer-fluid aperture 231 (see FIG. 5). The at least one baffle 410, 411 bifurcates a heat-transfer-fluid passage 321 formed between the core member 330 and the housing 201 so as to substantially isolate heat-transfer-fluid flow 381 between the at least one third heat-transfer-fluid aperture 230 and the at least one first heat-transfer-fluid aperture 400 from another heat-transfer-fluid flow 382 between the at least one fourth heat-transfer-fluid aperture 231 and the at least one second heat-transfer-fluid aperture 401.

The at least one first heat-transfer-fluid aperture 400, the at least one second heat-transfer-fluid aperture 401, the at least one third heat-transfer-fluid aperture 230, and the at least one fourth heat-transfer-fluid aperture 231 have substantially the same fluid flow rate so as to reduce any heat-transfer fluid stagnation within the extruding nozzle 200 that may reduce heat transfer between the extruded material 110 and the heat-transfer fluid 171 (FIG. 1). A pitch 420 (FIG. 4B) of the helical fin 336 effects a fluid flow rate that is substantially the same as another fluid flow rate of one or more of the at least one first heat-transfer-fluid aperture 400 and the at least one second heat-transfer-fluid aperture 401 so as to reduce any heat-transfer fluid stagnation within the extruding nozzle 200 that may reduce heat transfer between the extruded material 110 and the heat-transfer fluid 171 (FIG. 1).

In the figures the heat-transfer-fluid flow 380, 381, 382 is illustrated as flowing from the at least one third heat-transfer-fluid aperture 230 to the at least one fourth heat-transfer-fluid aperture 231. For example, heat-transfer fluid 171 (FIG. 1) flows from the at least one third heat-transfer-fluid aperture 230 through the at least one first heat-transfer-fluid aperture 400 and into the heat-transfer-fluid passage 332; from the heat-transfer-fluid passage 332 through the at least one second heat-transfer-fluid aperture 401 to at least one fourth heat-transfer-fluid aperture 231; and through the helical heat-transfer-fluid passage 340. In other aspects the heat-transfer-fluid flow 380, 381, 382 may be reversed so that heat-transfer fluid 171 (FIG. 1) flows from the at least one fourth heat-transfer-fluid aperture 231 to the at least one third heat-transfer-fluid aperture 230 rather than from the at least one third heat-transfer-fluid aperture 230 to the at least one fourth heat-transfer-fluid aperture 231. Any suitable heat-transfer fluid source 170 (FIG. 1) provides the heat-transfer fluid 171 (FIG. 1) to and receives the heat-transfer fluid 171 from the extruding nozzle 200 where the heat-transfer fluid source 170 is coupled to the from the at least one third heat-transfer-fluid aperture 230 to the at least one fourth heat-transfer-fluid aperture 231 through any suitable conduits 172.

The at least one material-flow channel 310 is at least partially disposed within the housing 201 and extends through the radiator 210. The at least one material-flow channel 310 extends through the at least one peripheral wall 331 of the core member 330. For example, each of the at least one material-flow channel 310 longitudinally extends through the core member 330 and is radially disposed between the at least one peripheral wall 331 and the heat-transfer fins 335 so that heat-transfer fluid 171 flowing through the extruding nozzle 200 cools the extruded material 110 as described herein. Referring also to FIG. 3B, the at least one material-flow channel 310 includes an internal wall 360 forming a fluid passage 361 having a tapered cross-sectional shape 362 (illustrated in FIGS. 3A and 3B) with a width 700 (see FIG. 7) that varies along a length of the fluid passage. In one aspect, the length of the fluid passage 361 along which the width 700 varies may be substantially the same as the length 398 of the core member 330; while in other aspects the length along which the width 700 varies may be any suitable portion of the length 398. For example, the width 700 of the tapered cross-sectional shape 362 increases in a flow direction of extruded material flowing through the fluid passage 361. The fluid passage 361 of the at least one material-flow channel 310 has, e.g., an inlet aperture 301 and an exit aperture 302, where the exit aperture 302 is larger than the inlet aperture 301 so as to form the tapered cross-sectional shape 362.

For exemplary purposes only, the inlet aperture 301 may have a diameter of about 0.25 inches (about 6 mm) and the exit aperture 302 may have a diameter of about 0.31 inches (about 8 mm); while in other aspects the inlet aperture 301 and the exit aperture 302 may have any suitable dimensions so as to form the tapered cross-sectional shape 362. The tapered cross-sectional shape 362 is sized to accommodate any expansion of the extruded material 110 as the extruded material 110 flows through the at least one material-flow channel 310 and so that clearance is provided between the internal wall 360 and the extruded material 110 at outlet 365 (see FIG. 3B), formed by the exit aperture 302, of the at least one material-flow channel 310. The clearance provides for a progressive air gap between the extruded material 110 and the internal wall 360 so that the extruded material moves freely through the extruding nozzle 200. The clearance also provides for movement of the extruded material 110 at the outlet 365 for pelletizing the extruded material 110. In the figures, nine (9) material-flow channels 310 are illustrated; however in other aspects any suitable number of material-flow channels 310 may be provided.

Referring to FIGS. 3A, 4A, 6A, and 6B, the extruding nozzle 200 includes a breaker head 600 rotatably coupled to one or more of the housing 201 and the radiator 210. For example, the breaker head 600 may be rotatably coupled to a mounting shaft 450 that extends from the radiator 210; while in other aspects a hollow mounting shaft 451 may be a hollow shaft that extends from the housing 201 (see FIG. 6C). The breaker head 600 is configured to break the extruded material 110 exiting the at least one material-flow channel 310 into pellets 890 (see FIG. 8C). For example, where the breaker head 600 is rotatably coupled to the hollow mounting shaft 451 the breaker head (see FIG. 6D) includes an outer rim 699 and central hub 698. The outer rim 699 may be rotatably coupled to the hollow mounting shaft 451 in any suitable manner such as with suitable bearings 666.

At least one tooth 697 or a plurality of teeth 696 radially extend between the outer rim 699 and central hub 698 so that the extruded material 110 passes through an aperture 695 between the central hub 698 and outer rim 699 and/or apertures 695 disposed between the plurality of teeth 696. Where the breaker head 600 is rotatably coupled to the mounting shaft 450, the breaker head includes a central hub 610 and the at least one tooth 697 or the plurality of teeth 696 extend radially outward from the central hub 610. The central hub 610 is rotatably coupled to the mounting shaft 450 in any suitable manner, such as with any suitable bearings 691, which may be substantially similar to bearings 666. Any suitable seal 690 (see FIG. 3A) may be provided between the breaker head 600 and the mounting shaft 450 so any debris that may be generated during pelletization of the extruded material 110 is kept away from the bearings 691. The shape and configuration of the breaker head 600 described herein is exemplary only and in other aspects the breaker head 600 may have any suitable configuration.

The plurality of teeth 696 have a circumferential spacing 650 corresponding with a circumferential spacing 571 (see FIG. 5) of the at least one material-flow channel 310 (see also FIGS. 1 and 2B) so as to break the extruded material 110 exiting each of the at least one material-flow channel 310 into the pellets 890 (see FIG. 8) substantially simultaneously. For example, the breaker head 600 comprises at least one tooth 697, where a number of the at least one tooth 697 is the same as a number of the at least one material-flow channel 310 (e.g., where there are nine material-flow channels 310 there are nine teeth 697). In other aspects, the breaker head comprises at least one tooth 697, where a number of the at least one tooth 697 is less than a number of the at least one material-flow channel 310 (see FIG. 6D where, e.g., the breaker head includes two teeth 697 and the number of material-flow channels 310 may be nine). In still other aspects, the breaker head comprises at least one tooth 697, where a number of the at least one tooth 697 is greater than a number of the at least one material-flow channel 310 (see FIGS. 6A and 6E where the number of teeth 697 is nine and the number of material-flow channels 310 is four).

The breaker head 600 is configured to break the extruded material 110 exiting the at least one material-flow channel 310 into pellets 890 (see FIG. 8A-8C) substantially with reinforcing fibers 800 (see FIGS. 8A-8C) within the extruded material 110 remaining intact at broken ends 891, 892 (see FIG. 8C) of the pellets 890. For example, the breaker head includes at least one tooth 697 or each tooth 697 of a plurality of teeth 696, where each tooth 697 has a sickle shape (i.e., a sickle shaped tooth) having a semicircular blade 620. The sickle shape of the tooth 697 hooks the extruded material 110 and substantially prevents a radially outward bending of the extruded material 110 during pelletization (e.g., the tooth 697 is configured to simultaneously retain and break/fracture the extruded material 110). The sickle shape of the tooth 697 maintains lateral movement of the extruded material 110 in a direction 860 (see FIG. 7) of rotation of the breaker head 600 so as to form a pellet 890 (see FIG. 8C) by breaking or fracturing the extruded material 110.

The at least one tooth 697 includes a relieved portion 621 configured so that the extruded material 110 extends into (see FIG. 8C) an area 622 formed by the relieved portion 621 after being broken by the at least one tooth 697 so that movement of the extruded material 110 in flow direction 389 is substantially continuous through the extruding nozzle 200. The breaker head 600 (e.g., the at least one tooth 697) is spaced, in a flow direction 389 of the extruded material 110 exiting the at least one material-flow channel 310, from one or more of the housing 201 and radiator 210. A spacing 373 (see FIG. 3A) between the at least one tooth 697 and the one or more of the housing 201 and radiator 210 may be about 0.06 inch (about 1.5 mm) to about 0.1 inch (about 2.5 mm) or any other suitable spacing that provides for bending movement of the extruded material relative to the at least one material-flow channel 310. In other aspects, the spacing 373 may be less than about 0.06 inch (about 1.5 mm) or greater than about 0.1 inch (about 2.5 mm).

Referring to FIGS. 7 and 8A-8C, the cross-sectional area of the exit aperture 302 of the at least one material-flow channel 310 is larger than a cross-sectional area of extruded material 110 flowing there through so that the breaker head 600 effects lateral movement of the extruded material 110 relative to the at least one material-flow channel 310 (e.g., relative to a longitudinal axis 850 of the at least one material-flow channel 310). The lateral movement forces the extruded material 110 against the internal wall 360 of the at least one material-flow channel 310. As the at least one tooth 697 or the plurality of teeth 696 move(s) in direction 860 the semicircular blade 620 pushes a portion 810 of the extruded material 110 extending passed the exit aperture 302 in flow direction 389 and causes the lateral movement of the portion 810 of the extruded material 110 in direction 860.

The portion 810 of the extruded material 110 bends, so that the portion 810 of the extruded material 110 no longer extends substantially along the longitudinal axis 850, until the extruded material 110 impacts the internal wall 360 of the at least one material-flow channel 310. The bending of the portion 810 of the extruded material 110 by the semicircular blade 620 and the impact of the extruded material against the internal wall 360 (e.g., provides for movement of the extruded material that) causes the portion 810 of the extruded material 110 to snap or fracture (e.g., break off) from the remaining extruded material within the at least one material-flow channel 310 so as to form the pellet 890. The extruding nozzle 200 cools the extruded material 110 to a temperature (e.g., about room temperature 102) that stiffens the extruded material so that the extruded material is able to be fractured by the breaker head 600.

Referring to FIG. 1, the drive 150 is coupled to at least the extruding nozzle 200. For example, the drive 150 is coupled to the breaker head 600 so as to rotate the breaker head 600 in a predetermined rotational movement. In one aspect, the predetermined rotational movement is a stepped movement where the breaker head periodically rotates in direction 860 (e.g., starts rotating and stops rotating at predetermined timed intervals). In other aspects, the predetermined rotational movement may be a continuous movement in direction 860. The drive 150 includes a drive support arm 180 that is coupled to the housing 201 so as to be rotationally fixed relative to the extruding nozzle 200. Any suitable drive motor 181, such as a servo gear drive 167, is coupled to the drive support arm 180. A drive wheel 182 is rotatably coupled to the drive support arm 180 about a rotation axis 183. A first drive link 175 is rotatably coupled at a first end 176 to the drive wheel 182 about rotation axis 184. A second drive link 178 is rotatably coupled at a first end 174 to the breaker head 600 about rotation axis 188. A second end 179 of the second drive link 178 is rotatably coupled to a second end 177 of the first drive link 175 about rotation axis 186. The drive motor 181 is coupled to the drive wheel 182 by any suitable transmission 160, such as a belt and pulley transmission, a gear train, etc. so that rotation of an output shaft 173 of the drive motor 181 drives rotation of the drive wheel 182 about rotation axis 183. In other aspects, the drive motor 181 may be substantially directly coupled to the drive wheel 182, such as where the drive wheel 182 is coupled directly to the output shaft 173 of the drive motor 181 so as to eliminate the transmission 160.

As the drive motor 181 rotates the drive wheel 182, the first end 176 of the first drive link 175 rotates about the rotation axis 183. The rotation of the first end 176 of the first drive link 175 about rotation axis 183 causes a reciprocating movement of the second end 177 of the first drive link 175 generally in direction 161. The reciprocating movement of the second end 177 of the first drive link causes a reciprocating rotation of the second drive link 178 about rotation axis 188 in directions 860, 860. This reciprocating rotation of the second drive link 178 about rotation axis 188 causes the rotational advancement of the breaker head 600 in direction 860. For example, referring also to FIGS. 7 and 9, an opposing ratchet mechanism 155 is provided and includes a drive ratchet 910 and a breaker head ratchet 900. The drive ratchet 910 includes a drive gear 903 and a pawl 902. The drive gear 903 is formed on an outer peripheral surface 630 of the breaker head 600 and includes a plurality of ratchet teeth 906. The pawl 902 is rotationally coupled to the second drive link 178 so as to engage the plurality of ratchet teeth 906 of the drive gear 903 so as to rotate the breaker head 600 in direction 860 when the second drive link rotates in direction 860. The pawl 902 is rotationally coupled to the second drive link 178 so as to disengage the plurality of ratchet teeth 906 of the drive gear 903 so that the breaker head 600 is not rotated in direction 861 when the second drive link rotates in direction 861.

The breaker head ratchet 900 includes a drive gear 904 and a pawl 901. The drive gear 904 is formed on an inner peripheral surface 631 of the breaker head 600 and includes a plurality of ratchet teeth 907. The pawl 901 is rotationally coupled to the mounting shaft 450 so as to engage the plurality of ratchet teeth 907 of the drive gear 904 so as to rotate the breaker head 600 in direction 860 when the second drive link rotates in direction 860. The pawl 901 is rotationally coupled to the mounting shaft 450 so as to disengage the plurality of ratchet teeth 907 of the drive gear 904 so that the breaker head 600 is not rotated in direction 861 when the second drive link rotates in direction 861 (e.g., the breaker head ratchet 900 prevents rotation of the breaker head 600 in direction 861 when the breaker head 600 rotates in direction 861 and the pawl 902 of the drive ratchet 910 is disengaged from and sliding over the ratchet teeth 906 of the drive gear 903). The breaker head ratchet 900 may be substantially similar to the configuration of the drive ratchet 910 where the breaker head 600 is rotatably coupled to the hollow mounting shaft 451 of FIG. 6C; however, the breaker head ratchet 900 operates as described above.

Referring to FIGS. 1 and 2B, a distance 153 between the rotation axis 183 of the drive wheel 182 and the rotation axis 184 controls the amount of stroke (e.g., the amount of rotation) of the of the second drive link 178 and of the breaker head 600 in direction 860. The distance 153 is such that each tooth 697 of the breaker head 600 advances in direction 860 so as to pass only a single material-flow channel 310 and a number of pellets 890 produced with one rotation of the drive wheel 182 (i.e., with a single advancement of the breaker head 600 in direction 860) is equal to the number of material-flow channels 310 (e.g., where there are nine material-flow channels 310 nine pellets 890 are substantially simultaneously produced with a single rotation of the drive wheel 182 (i.e., with a single advancement of the breaker head 600 in direction 860)). A length 187 of the first drive link 175 between rotation axes 184, 186 and a length 189 of the second drive link 178 between rotation axes 186, 188 are configured so as to generate sufficient force to simultaneously break or fracture the extruded material 110 from the material-flow channels 310 of the extruding nozzle 200. For example, the length 189 of the second drive link 178 may be about 6 inches (about 15 cm), where the length 187 of the first drive link 175 is dependent on the length 189 of the second drive link 178, so as to generate about 14 lbs (about 62 N) of force 166 in the first drive link (e.g., about 84 lb-in or about 9.5 N-m of torque is generated by the second drive link 178).

Referring to FIGS. 1 and 8A-8C, any suitable controller 105 is coupled to the drive motor 181 to activate and deactivate the drive motor 181. The controller 105 is programmed to activate and deactivate the drive motor 181 at predetermined periodic intervals and advance the rotation of the breaker head 600 in direction 860 at the predetermined periodic time intervals. The activation of the drive motor 181 is timed depending on a feed rate of the extruded material 110 through the extruding nozzle 200 so as to produce a pellets 890 (FIG. 8C) each having a predetermined length 888 (FIG. 8C). For example, where a feed rate of the extruded material 110 in flow direction 389 (see FIGS. 8A-8C) through the extruding nozzle 200 may be about 1 in/sec (about 25 mm/sec) or about 0.5 in/sec (about 13 mm/sec). To produce a pellet 890 (FIG. 8C) having a length of about 1 inch (about 24 mm) at a feed rate of about 1 in/sec (about 25 mm/sec) the controller 105 activates the drive motor 181 every 1 second. To produce a pellet 890 (FIG. 8C) having a length of about 1 inch (about 24 mm) at a feed rate of about 0.5 in/sec (about 25 mm/sec) the controller 105 activates the drive motor 181 every 2 seconds. In other aspects, the pellet length, the feed rates, and the drive motor 181 actuation times may be greater or less than those noted above so produce pellets having any suitable predetermined length 888. In other aspects, such as where the number of teeth 697 (see FIG. 6D) of the breaker head are less than the number of the number of material-flow channels 310 (see, e.g., FIG. 5), the controller 105 may be configured to activate the drive motor 181 so that the breaker head 600 is continuously rotated to produce the pellets 890.

Referring to FIGS. 1, 8A-8C, and 10 and exemplary method for pelletizing an extruded material 110 with an extruding nozzle 200 will be described. The method includes inserting the extruded material 110 into the extruding nozzle 200 (FIG. 10, Block 1000) so that the extruded material 110 flows through at least one (or more than one) material-flow channel 310 extending through the radiator 210 of the extruding nozzle 200. The extruded material 110 is inserted into the extruding nozzle 200 by and from the extruding machine 199 in any suitable manner. In one aspect, inserting the extruded material 110 into the extruding nozzle includes inserting a (highly filled) thermoset resin 801 (see FIG. 8A) into the extruding nozzle 200; while in other aspects, a (highly filled) thermoplastic material 802 is inserted into the extruding nozzle 200. The extruded material 110 is directed towards the at least one (or more than one) material-flow channel 310 (FIG. 10, Block 1001) with a diverter member 337 coupled to the radiator 210.

During pelletization of the extruded material 110, the heat-transfer fluid 171 is supplied by and circulated through the extruding nozzle 200 by the heat-transfer fluid source 170. The heat-transfer fluid source 170 may be a heat-transfer fluid chiller and the heat-transfer fluid 171 may be any suitable heat-transfer fluid. The heat-transfer fluid 171 is introduced to the extruding nozzle 200 through the at least one (or more than one) third heat-transfer-fluid aperture 230. The heat-transfer fluid 171 then passes through the at least one (or more than one) first heat-transfer-fluid aperture 400 to the heat-transfer-fluid passage 332 of the radiator 210 core member 330. Heat-transfer fluid 171 exits the heat-transfer-fluid passage 332 through the at least one (or more than one) second heat-transfer-fluid aperture 401 so as to flow passed the heat-transfer fins 335 along the helical heat-transfer-fluid passage 340 to exit the extruding nozzle 200 through the at least one (or more than one) fourth heat-transfer-fluid aperture 231. The heat-transfer fluid 171 is maintained towards the exit aperture 302 (see FIG. 8A) of the at least one (or more than one) material-flow channel 310 (FIG. 10, Block 1008) with the helical fin 336 of the radiator 210 so as to increase heat transfer towards the exit aperture 302 compared to a heat transfer towards the inlet aperture 301 of the at least one material-flow channel 310. In other aspects, the heat-transfer fluid 171 flow may be in an opposite direction to what is described above.

The extruding nozzle is configured, as described above, so that the flow rate of the heat-transfer fluid 171 is substantially the same throughout the extruding nozzle 200. Heat is transferred between the extruded material 110 flowing through the at least one material-flow channel 310 and the radiator 210 (FIG. 10, Block 1005), where the radiator 210 is at least partially disposed within the housing 201 of the extruding nozzle 200. The extruded material 110 flowing through the at least one material-flow channel 310 is cooled (FIG. 10, Block 1006) when transferring the heat between the extruded material 110 and the radiator 210 so that the breaker head 600 can break or fracture the extruded material 110 without smearing the extruded material 110 and producing pellets having inconsistent lengths. The extruded material 110 is cooled to an ambient temperature 101 (FIG. 10, Block 1007) external to the extruding nozzle 200. The ambient temperature 101 may be room temperature 102 or any other temperature that does not generate condensation on the extruded material 110 exiting the extruding nozzle 200.

The extruded material 110 exiting the at least one material-flow channel 310 is broken or fractured into pellets 890 with the breaker head 600 (FIG. 10, Block 1009) so that reinforcing fibers 800 within the extruded material 110 remain intact at broken ends 891, 892 of the pellets 890. To break or fracture the extruded material, the breaker head 600 is moved relative to the at least one material-flow channel 310 so as to break or fracture the extruded material 110. Moving the breaker head includes rotating the breaker head in direction 860. The breaker head 600 is moved relative to the at least one material-flow channel 310 at predetermined periodic intervals so as to break the extruded material 110 into pellets 890 having a predetermined length 888 (FIG. 8C). The extruded material 110 is moved laterally relative to the at least one material-flow channel 310 with the breaker head 600 so as to force the extruded material 110 against the internal wall 360 of the at least one material-flow channel 310 to break or fracture the extruded material 110. The breaking of the extruded material 110 includes substantially preventing radially outward movement of the extruded material 110 with the sickle shaped tooth 697 of the breaker head 600.

The following are provided in accordance with the aspects of the present disclosure:

A1. An extruding nozzle comprising:

a housing;

a radiator at least partially disposed within the housing; and at least one material-flow channel at least partially disposed within the housing and extending through the radiator.

A2. The extruding nozzle of paragraph A1, wherein the radiator comprises:

a core member having at least one peripheral wall;

a heat-transfer-fluid passage formed by the at least one peripheral wall within an interior of the core member;

at least one first heat-transfer-fluid aperture extending through the at least one peripheral wall;

heat-transfer fins extending outward from the at least one peripheral wall; and at least one second heat-transfer-fluid aperture extending through the at least one peripheral wall communicably coupling cooling-fluid flow between the heat-transfer-fluid passage and the heat-transfer fins.

A3. The extruding nozzle of paragraph A2, wherein the heat-transfer fins comprise a helical fin extending at least partially along a length of the core member so as to form a helical heat-transfer-fluid passage between the core member and the housing.

A4. The extruding nozzle of paragraph A2 or A3, wherein the housing comprises:

at least one third heat-transfer-fluid aperture communicably coupled with the at least one first heat-transfer-fluid aperture of the radiator; and at least one fourth heat-transfer-fluid aperture communicably coupled with the at least one second heat-transfer-fluid aperture of the radiator.

A5. The extruding nozzle of paragraph A4, further comprising at least one baffle disposed between the at least one third heat-transfer-fluid aperture and the at least one fourth heat-transfer-fluid aperture so as to substantially isolate heat-transfer-fluid flow between the at least one third heattransfer-fluid aperture and the at least one first heat-transfer-fluid aperture from another heat-transfer-fluid flow between the at least one fourth heat-transfer-fluid aperture and the at least one second heat-transfer-fluid aperture.

A6. The extruding nozzle of paragraph A5, wherein the at least one baffle bifurcates a heat-transfer-fluid passage formed between the core member and the housing.

A7. The extruding nozzle of paragraphs A4 to A6, wherein the at least one first heat-transfer-fluid aperture, the at least one second heat-transfer-fluid aperture, the at least one third heat-transfer-fluid aperture, and the at least one fourth heat-transfer-fluid aperture have substantially the same fluid flow rate.

A8. The extruding nozzle of paragraphs A3 to A7, wherein a pitch of the helical fin effects a fluid flow rate that is substantially the same as another fluid flow rate of one or more of the at least one first heat-transfer-fluid aperture and the at least one second heat-transfer-fluid aperture.

A9. The extruding nozzle of paragraphs A2 to A8, wherein the at least one material-flow channel extends through the at least one peripheral wall of the core member.

A10. The extruding nozzle of paragraphs A1 to A9, wherein at least one material-flow channel comprises an internal wall forming a fluid passage having a tapered cross-sectional shape with a width that varies along a length of the fluid passage.

A11. The extruding nozzle of paragraph A10, wherein the width of the tapered cross-sectional shape increases in a flow direction of extruded material flowing through the fluid passage.

A12. The extruding nozzle of paragraphs A1 to A11, further comprising an extruder flange coupled to one or more of the housing and radiator, the extruder flange being configured to couple the extruding nozzle to an extruder machine.

A13. The extruding nozzle of paragraph A12, further comprising at least one seal disposed between the extruder flange and one or more of the housing and the radiator.

A14. The extruding nozzle of paragraphs A1 to A13, further comprising at least one seal disposed between the housing and the radiator.

A15. The extruding nozzle of paragraphs A1 to A14, further comprising a diverter member coupled to the radiator, the diverter member being configured to divert extruded material from an extruding machine to the at least one material-flow channel.

A16. The extruding nozzle of paragraph A15, further comprising at least one seal disposed between the diverter member and the radiator.

A17. The extruding nozzle of paragraphs A1 to A16, further comprising a breaker head rotatably coupled to one or more of the housing and the radiator, the breaker head being configured to break extruded material exiting the at least one material-flow channel into pellets.

A18. The extruding nozzle of paragraph A17, wherein the breaker head is configured to break extruded material exiting the at least one material-flow channel into pellets substantially with reinforcing fibers within the extruded material remaining intact at broken ends of the pellets.

A19. The extruding nozzle of paragraph A17 or A18, wherein the breaker head comprises a plurality of teeth having a circumferential spacing corresponding with a circumferential spacing of the at least one material-flow channel so as to break the extruded material exiting each of the at least one material-flow channel into the pellets substantially simultaneously.

A20. The extruding nozzle of paragraph A17 or A18, wherein the breaker head comprises at least one tooth, where a number of the at least one tooth is the same as a number of the at least one material-flow channel.

A21. The extruding nozzle of paragraph A17 or A18, wherein the breaker head comprises at least one tooth, where a number of the at least one tooth is less than a number of the at least one material-flow channel.

A22. The extruding nozzle of paragraph A17 or A18, wherein the breaker head comprises at least one tooth, where a number of the at least one tooth is greater than a number of the at least one material-flow channel.

A23. The extruding nozzle of paragraphs A17 to A22, wherein the breaker head comprises at least one sickle shaped tooth.

A24. The extruding nozzle of paragraph A23, wherein each of the at least one sickle shaped tooth comprises a relieved portion configured so that the extruded material extends into an area formed by the relieved portion after being broken by the at least one sickle shaped tooth.

A25. The extruding nozzle of paragraphs A17 to A24, wherein a cross-sectional area of an exit aperture of the at least one material-flow channel is larger than a cross-sectional area of extruded material flowing therethrough so that the breaker head effects lateral movement of the extruded material relative to the at least one material-flow channel that forces the extruded material against an internal wall of the at least one material-flow channel.

A26. The extruding nozzle of paragraphs A17 to A25, wherein the breaker head is spaced, in a flow direction of the extruded material exiting the at least one material-flow channel, from one or more of the housing and radiator.

B1. An extruding nozzle system comprising:
an extruding nozzle including
a housing,
a radiator at least partially disposed within the housing,
at least one material-flow channel at least partially disposed within the housing and extending through the radiator, and
a breaker head rotatably coupled to one or more of the housing and the radiator, the breaker head being configured to break extruded material exiting the at least one material-flow channel into pellets; and
a drive coupled to the breaker head so as to rotate the breaker head in a predetermined rotational movement.

B2. The extruding nozzle system of paragraph B1, wherein the radiator comprises:
a core member having at least one peripheral wall;
a heat-transfer-fluid passage formed by the at least one peripheral wall within an interior of the core member;
at least one first heat-transfer-fluid aperture extending through the at least one peripheral wall;
heat-transfer fins extending outward from the at least one peripheral wall; and
at least one second heat-transfer-fluid aperture extending through the at least one peripheral wall communicably coupling cooling-fluid flow between the heat-transfer-fluid passage and the heat-transfer fins.

B3. The extruding nozzle system of paragraph B2, wherein the heat-transfer fins comprise a helical fin extending at least partially along a length of the core member so as to form a helical heat-transfer-fluid passage between the core member and the housing.

B4. The extruding nozzle system of paragraph B2 or B3, wherein the housing comprises:

at least one third heat-transfer-fluid aperture communicably coupled with the at least one first heat-transfer-fluid aperture of the radiator; and at least one fourth heat-transfer-fluid aperture communicably coupled with the at least one second heat-transfer-fluid aperture of the radiator.

B5. The extruding nozzle system of paragraph B4, further comprising at least one baffle disposed between the at least one third heat-transfer-fluid aperture and the at least one fourth heat-transfer-fluid aperture so as to substantially isolate heat-transfer-fluid flow between the at least one third heat-transfer-fluid aperture and the at least one first heat-transfer-fluid aperture from another heat-transfer-fluid flow between the at least one fourth heat-transfer-fluid aperture and the at least one second heat-transfer-fluid aperture.

B6. The extruding nozzle system of paragraph B5, wherein the at least one baffle bifurcates a heat-transfer-fluid passage formed between the core member and the housing.

B7. The extruding nozzle system of paragraphs B4 to B6, wherein the at least one first heat-transfer-fluid aperture, the at least one second heat-transfer-fluid aperture, the at least one third heat-transfer-fluid aperture, and the at least one fourth heat-transfer-fluid aperture have substantially the same fluid flow rate.

B8. The extruding nozzle system of paragraphs B3 to B7, wherein a pitch of the helical fin effects a fluid flow rate that is substantially the same as another fluid flow rate of one or more of the at least one first heat-transfer-fluid aperture and the at least one second heat-transfer-fluid aperture.

B9. The extruding nozzle system of paragraphs B2 to B8, wherein the at least one material-flow channel extends through the at least one peripheral wall of the core member.

B10. The extruding nozzle system of paragraphs B1 to B9, wherein at least one material-flow channel comprises an internal wall forming a fluid passage having a tapered cross-sectional shape with a width that varies along a length of the fluid passage.

B11. The extruding nozzle system of paragraph B10, wherein the width of the tapered cross-sectional shape increases in a flow direction of extruded material flowing through the fluid passage.

B12. The extruding nozzle system of paragraphs B1 to B11, further comprising an extruder flange coupled to one or more of the housing and radiator, the extruder flange being configured to couple the extruding nozzle to an extruder machine.

B13. The extruding nozzle system of paragraph B12, further comprising at least one seal disposed between the extruder flange and one or more of the housing and the radiator.

B14. The extruding nozzle system of paragraphs B1 to B13, further comprising at least one seal disposed between the housing and the radiator.

B15. The extruding nozzle system of paragraphs B1 to B14, further comprising a diverter member coupled to the radiator, the diverter member being configured to divert extruded material from an extruding machine to the at least one material-flow channel.

B16. The extruding nozzle system of paragraph B15, further comprising at least one seal disposed between the diverter member and the radiator.

B17. The extruding nozzle system of paragraphs B1 to B16, wherein the breaker head is configured to break extruded material exiting the at least one material-flow channel into pellets substantially with reinforcing fibers within the extruded material remaining intact at broken ends of the pellets.

B18. The extruding nozzle system of paragraphs B1 to B17, wherein the breaker head comprises a plurality of teeth having a circumferential spacing corresponding with a circumferential spacing of the at least one material-flow channel so as to break the extruded material exiting each of the at least one material-flow channel into the pellets substantially simultaneously.

B19. The extruding nozzle system of paragraphs B1 to B17, wherein the breaker head comprises at least one tooth, where a number of the at least one tooth is the same as a number of the at least one material-flow channel.

B20. The extruding nozzle system of paragraphs B1 to B17, wherein the breaker head comprises at least one tooth, where a number of the at least one tooth is less than a number of the at least one material-flow channel.

B21. The extruding nozzle system of paragraphs B1 to B17, wherein the breaker head comprises at least one tooth, where a number of the at least one tooth is greater than a number of the at least one material-flow channel.

B22. The extruding nozzle system of paragraphs B1 to B21, wherein the breaker head comprises at least one sickle shaped tooth.

B23. The extruding nozzle system of paragraph B22, wherein each of the at least one sickle shaped tooth comprises a relieved portion configured so that the extruded material extends into an area formed by the relieved portion after being broken by the at least one sickle shaped tooth.

B24. The extruding nozzle system of paragraphs B1 to B23, wherein a cross-sectional area of an exit aperture of the at least one material-flow channel is larger than a cross-sectional area of extruded material flowing there through so that the breaker head effects lateral movement of the extruded material relative to the at least one material-flow channel that forces the extruded material against an internal wall of the at least one material-flow channel.

B25. The extruding nozzle system of paragraphs B1 to B24, wherein the breaker head is spaced, in a flow direction of the extruded material exiting the at least one material-flow channel, from one or more of the housing and radiator.

B26. The extruding nozzle system of paragraphs B1 to B25, wherein the drive comprises:

a drive motor; and a controller configured to activate and deactivate the drive motor.

B27. The extruding nozzle system of paragraph B26, wherein the controller is configured to activate and deactivate the drive motor at predetermined periodic time intervals.

B28. The extruding nozzle system of paragraphs B1 to B27, wherein the drive comprises a servo gear drive.

C1. A method for pelletizing an extruded material with an extruding nozzle, the method comprising:

inserting the extruded material into the extruding nozzle so that the extruded material flows through at least one material-flow channel extending through a radiator of the extruding nozzle; and transferring heat between the extruded material flowing through the at least one material-flow channel and the radiator, where the radiator is at least partially disposed within a housing of the extruding nozzle.

C2. The method of paragraph C1, further comprising cooling the extruded material flowing through the at least one material-flow channel when transferring the heat between the extruded material and the radiator.

C3. The method of paragraph C2, wherein cooling the extruded material includes cooling the extruded material to an ambient temperature external to the extruding nozzle.

C4. The method of paragraphs C1 to C3, further comprising maintaining a heat-transfer fluid towards an exit aperture of the at least one material-flow channel with a helical fin of the radiator.

C5. The method of paragraphs C1 to C4, further comprising directing the extruded material towards the at least one material-flow channel with a diverter member coupled to the radiator.

C6. The method of paragraphs C1 to C5, further comprising breaking the extruded material exiting the at least one material-flow channel into pellets with a breaker head so that reinforcing fibers within the extruded material remain intact at broken ends of the pellets.

C7. The method of paragraph C6, further comprising moving the breaker head relative to the at least one material-flow channel so as to break the extruded material.

C8. The method of paragraph C7, wherein moving the breaker head comprises rotating the breaker head.

C9. The method of paragraph C6 to C8, wherein breaking the extruded material comprises laterally moving the extruded material, flowing through the at least one material-flow channel, relative to the at least one material-flow channel with the breaker head so as to force the extruded material against an internal wall of the at least one material-flow channel.

C10. The method of paragraph C6 to C9, wherein breaking the extruded material comprises substantially preventing radially outward movement of the extruded material with a sickle shaped tooth of the breaker head.

C11. The method of paragraphs C6 to C10, wherein breaking the extruded material comprises moving the breaker head relative to the at least one material-flow channel at predetermined periodic intervals so as to break the extruded material into pellets having a predetermined length.

C12. The method of paragraphs C1 to C11, wherein inserting the extruded material into the extruding nozzle comprises inserting a thermoset resin into the extruding nozzle.

C13. The method of paragraphs C1 to C11, wherein inserting the extruded material into the extruding nozzle comprises inserting a thermoplastic material into the extruding nozzle.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for pelletizing an extruded material with an extruding nozzle, the method comprising steps of:
    inserting the extruded material into the extruding nozzle so that the extruded material flows through at least one material-flow channel that extends through a radiator of the extruding nozzle; and
    transferring heat between the extruded material, flowing through the at least one material-flow channel, and the radiator, where at least a portion of the radiator is located within a housing of the extruding nozzle;
    wherein the radiator comprises:
        a core member, comprising at least one peripheral wall;
        a heat-transfer-fluid passage, formed by the at least one peripheral wall within an interior of the core member;
        at least one first heat-transfer-fluid aperture, extending through the at least one peripheral wall;
        heat-transfer fins, extending outward from the at least one peripheral wall; and
        at least one second heat-transfer-fluid aperture, extending through the at least one peripheral wall and communicably coupling the heat-transfer-fluid passage and the heat-transfer fins so that cooling-fluid flow is provided therebetween.

2. The method of claim 1, further comprising a step of cooling the extruded material, flowing through the at least one material-flow channel when transferring the heat between the extruded material and the radiator.

3. The method of claim 2, wherein the extruded material is cooled to an ambient temperature of air, surrounding the extruding nozzle.

4. The method of claim 1, further comprising a step of directing a heat-transfer fluid toward an exit aperture of the at least one material-flow channel with a helical fin of the radiator.

5. The method of claim 1, further comprising diverting, with a diverter member, the extruded material from an extruding machine to the at least one material-flow channel, wherein the diverter member is coupled to the radiator.

6. The method of claim 1, further comprising a step of breaking the extruded material, exiting the at least one material-flow channel, into pellets with a breaker head,
    wherein
        the extruded material comprises reinforcing fibers; and
        the reinforcing fibers within the extruded material remain intact at broken ends of the pellets.

7. The method of claim 6, further comprising a step of moving the breaker head relative to the at least one material-flow channel so as to break the extruded material.

8. The method of claim 7, wherein the step of moving the breaker head comprises rotating the breaker head.

9. The method of claim 6, wherein the step of breaking the extruded material comprises laterally moving the extruded material, flowing through the at least one material-flow channel, relative to the at least one material-flow channel with the breaker head so as to force the extruded material against an internal wall of the at least one material-flow channel.

10. The method of claim 6, wherein the step of breaking the extruded material comprises substantially preventing radially outward movement of the extruded material, relative to the breaker head, with a sickle shaped tooth of the breaker head.

11. The method of claim 6, wherein the step of breaking the extruded material comprises moving the breaker head relative to the at least one material-flow channel at predetermined periodic intervals so as to break the extruded material into the pellets, having a predetermined length.

12. The method of claim 6, wherein:
    a cross-sectional area of an exit aperture of the at least one material-flow channel is larger than a cross-sectional area of the extruded material, flowing therethrough, so that the breaker head causes lateral movement of the extruded material relative to the at least one material-flow channel, and
    the lateral movement forces the extruded material against an internal wall of the at least one material-flow channel.

13. The method of claim 1, further comprising breaking the extruded material, exiting the at least one material-flow channel, into pellets with a breaker head,
    wherein
        the breaker head comprises teeth, having a circumferential spacing about a longitudinal axis of the extruding nozzle, and
        the circumferential spacing about the longitudinal axis of the extruding nozzle corresponds to a circumferential spacing of the at least one material-flow channel about the longitudinal axis of the extruding nozzle so as to substantially simultaneously break the extruded material, exiting each of the at least one material-flow channel, into the pellets.

14. The method of claim 1, wherein the step of inserting the extruded material into the extruding nozzle comprises inserting a thermoset resin into the extruding nozzle.

15. The method of claim 1, wherein the step of inserting the extruded material into the extruding nozzle comprises inserting a thermoplastic material into the extruding nozzle.

16. The method of claim 1, further comprising coupling, with an extruder flange, the extruding nozzle to an extruder machine,
wherein the extruder flange is coupled to one or more of the housing or the radiator.

17. A method for pelletizing an extruded material with an extruding nozzle, the method comprising:
inserting the extruded material into the extruding nozzle so that the extruded material flows through at least one material-flow channel, extending through a radiator of the extruding nozzle;
transferring heat between the extruded material, flowing through the at least one material-flow channel, and the radiator, wherein at least a portion of the radiator is located within a housing of the extruding nozzle; and
with a breaker head, breaking the extruded material, exiting the at least one material-flow channel into pellets,
wherein:
the breaker head is rotatably coupled to one or more of the housing and the radiator,
the breaker head is coupled to a drive motor,
a controller is coupled to the drive motor to activate and deactivate the drive motor so as to rotate the breaker head in a predetermined rotational movement, and
the radiator comprises:
a core member, comprising at least one peripheral wall;
a heat-transfer-fluid passage, formed by the at least one peripheral wall within an interior of the core member;
at least one first heat-transfer-fluid aperture, extending through the at least one peripheral wall;
heat-transfer fins, extending outward from the at least one peripheral wall; and
at least one second heat-transfer-fluid aperture, extending through the at least one peripheral wall and communicably coupling the heat-transfer-fluid passage and the heat-transfer fins so that cooling-fluid flow is provided therebetween.

18. The method of claim 17, wherein the drive motor is periodically activated and deactivated by the controller.

19. The method of claim 17, further comprising cooling the extruded material, flowing through the at least one material-flow channel, when transferring the heat between the extruded material and the radiator.

20. The method of claim 17, wherein:
the extruded material comprises reinforcing fibers; and
the reinforcing fibers within the extruded material remain intact at broken ends of the pellets.

* * * * *